United States Patent
Li et al.

(10) Patent No.: US 11,570,285 B2
(45) Date of Patent: Jan. 31, 2023

(54) PACKET PROCESSING METHOD, NETWORK NODE, AND SYSTEM

(71) Applicant: Huawei Technologies Co., Ltd., Shenzhen (CN)

(72) Inventors: Cheng Li, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 16/911,715

(22) Filed: Jun. 25, 2020

(65) Prior Publication Data

US 2020/0329129 A1    Oct. 15, 2020

Related U.S. Application Data

(63) Continuation of application No. PCT/CN2018/123292, filed on Dec. 25, 2018.

(30) Foreign Application Priority Data

Dec. 27, 2017    (CN) .......................... 201711451059.2

(51) Int. Cl.
*H04L 69/324*    (2022.01)
*H04L 43/0829*    (2022.01)
(Continued)

(52) U.S. Cl.
CPC ........ *H04L 69/324* (2013.01); *H04L 43/0835* (2013.01); *H04L 43/0858* (2013.01); *H04L 45/74* (2013.01)

(58) Field of Classification Search
None
See application file for complete search history.

(56) References Cited

U.S. PATENT DOCUMENTS 7,440,087 B2    10/2008    Froggatt et al.
2007/0242620 A1    10/2007    Zhai
(Continued)

FOREIGN PATENT DOCUMENTS

CN    1881908 A    12/2006
CN    101056215 A    10/2007
(Continued)

OTHER PUBLICATIONS

Filsfils, C., et al., "SRv6 Network Programming," draft-filsfils-spring-srv6-network-programming-02, Oct. 30, 2017, 49 pages.
(Continued)

*Primary Examiner* — Jay L Vogel
(74) *Attorney, Agent, or Firm* — Conley Rose, P.C.

(57) ABSTRACT

A packet processing method, a network node, and a system includes obtaining, by a first network node, a first packet that includes a segment list, where the segment list includes a segment identifier of a network node on a path used to forward the first packet, obtaining, by the first network node, a segment identifier of a second network node from the segment list, where the second network node is a next-hop segment node of the first network node on the path, replacing, by the first network node, a destination address of the first packet with the segment identifier of the second network node, and adding a network performance parameter of the first network node to the segment list to generate a second packet, and sending, by the first network node, the second packet to the second network node.

26 Claims, 10 Drawing Sheets

(51) Int. Cl.
*H04L 43/0852* (2022.01)
*H04L 45/74* (2022.01)
*H04L 45/64* (2022.01)
*H04L 45/50* (2022.01)
*H04L 45/00* (2022.01)
*H04L 43/08* (2022.01)

(56) References Cited

U.S. PATENT DOCUMENTS

| | | |
|---|---|---|
| 2014/0269266 A1 | 9/2014 | Filsfils et al. |
| 2014/0317259 A1 | 10/2014 | Previdi et al. |
| 2014/0369356 A1 | 12/2014 | Bryant et al. |
| 2015/0139024 A1 | 5/2015 | Kaplan et al. |
| 2015/0188804 A1 | 7/2015 | Ashwood-Smith |
| 2015/0256456 A1 | 9/2015 | Previdi et al. |
| 2015/0358221 A1 | 12/2015 | Guo et al. |
| 2016/0191400 A1* | 6/2016 | Sreeramoju ............ H04L 47/34 370/474 |
| 2016/0294702 A1 | 10/2016 | Kodialam et al. |
| 2017/0250908 A1 | 8/2017 | Nainar et al. |
| 2017/0339072 A1* | 11/2017 | Pignataro ............ H04L 45/566 |
| 2017/0373966 A1 | 12/2017 | Liao et al. |
| 2018/0019944 A1 | 1/2018 | Peng et al. |
| 2018/0034712 A1* | 2/2018 | Nainar ................ H04L 41/5009 |
| 2018/0034727 A1* | 2/2018 | Nainar .................... H04L 45/52 |
| 2018/0152369 A1 | 5/2018 | McCallen et al. |
| 2019/0020563 A1* | 1/2019 | Meilik .................... H04L 43/16 |
| 2019/0036818 A1* | 1/2019 | Nainar .................... H04L 45/74 |
| 2019/0104058 A1* | 4/2019 | Filsfils ................ H04L 43/106 |
| 2019/0288941 A1* | 9/2019 | Filsfils .................... H04L 69/22 |
| 2020/0076727 A1 | 3/2020 | Filsfils et al. |
| 2020/0274798 A1* | 8/2020 | Filsfils ................. H04L 45/566 |
| 2020/0328971 A1 | 10/2020 | Bashandy et al. |
| 2020/0329129 A1 | 10/2020 | Li et al. |
| 2021/0119895 A1* | 4/2021 | Li ........................ H04L 43/0876 |

FOREIGN PATENT DOCUMENTS

| | | |
|---|---|---|
| CN | 102035691 A | 4/2011 |
| CN | 102273136 B | 12/2012 |
| CN | 105282028 A | 1/2016 |
| CN | 105871721 A | 8/2016 |
| CN | 105871722 A | 8/2016 |
| CN | 105874752 A | 8/2016 |
| CN | 106657035 A | 5/2017 |
| CN | 107171882 A | 9/2017 |
| CN | 107548545 A | 1/2018 |
| CN | 107689915 A | 2/2018 |
| CN | 109981457 A | 7/2019 |
| EP | 1855416 A1 | 11/2007 |
| EP | 3154227 A1 | 4/2017 |

OTHER PUBLICATIONS

Fioccola, G., et al, "Alternate-Marking Method for Passive and Hybrid Performance Monitoring," Internet Engineering Task Force (IETF), RFC 8321, Jan. 2018, 33 pages.

Previdi, S., et al, "IS-IS Extensions for Segment Routing," draft-ietf-isis-segment-routing-extensions-16, Apr. 19, 2018, 35 pages.

Filsfils, C., et al, "SRv6 Network Programming," draft-filsfils-spring-srv6-network-programming-04, Mar. 4, 2018, 57 pages.

Gen, L., et al., "Software defined content centric network's segment routing strategy," Application Research of Computers, vol. 35, No. 7, Jul. 2018, 5 pages.

* cited by examiner

PACKET PROCESSING METHOD, NETWORK NODE, AND SYSTEM

CROSS-REFERENCE TO RELATED APPLICATIONS

This application is a continuation of International Patent Application No. PCT/CN2018/123292, filed on Dec. 25, 2018, which claims priority to Chinese Patent Application No. 201711451059.2, filed on Dec. 27, 2017. The disclosures of the aforementioned applications are hereby incorporated by reference in their entireties.

TECHNICAL FIELD

The present disclosure relates to the communications field, and in particular, to a packet processing method, a network node, and a system.

BACKGROUND

Segment routing (SR) is a source routing mechanism that can enable a network to achieve better scalability and provide functions such as traffic engineering (TE) and a Multiprotocol Label Switching (MPLS) virtual private network (VPN) in a simpler and more flexible manner. In a software-defined networking (SDN) network architecture, the SR provides a capability of quick interaction with an upper-layer application for the network. When being deployed on an Internet Protocol version 6 (IPv6) data plane, the SR is referred to as SRv6. In other approaches, performance measurement for an SRv6 network is mainly as follows. A network performance parameter such as a time stamp or a data packet quantity is recorded by coloring a packet based on a flow label (FL), and then network performance parameters of different nodes are obtained using a centralized controller in order to implement the performance measurement for the SRv6 network on the controller. However, in all current methods, the network performance parameter needs to be obtained using a specific protocol, resulting in high implementation complexity and inflexibility.

SUMMARY

This application provides a packet processing method, a network node, and a system, to provide a flexible network performance parameter sending method in order to facilitate flexible network performance calculation.

According to a first aspect, an embodiment of the present disclosure provides a packet processing method. The method includes obtaining, by a first network node, a first packet that includes a segment list, where the segment list includes a segment identifier (SID) of a network node on a path used to forward the first packet, obtaining, by the first network node, a SID of a second network node from the segment list, where the second network node is a next-hop segment node of the first network node on the path, replacing, by the first network node, a destination address of the first packet with the SID of the second network node, and adding a network performance parameter of the first network node to the segment list, to generate a second packet, and sending, by the first network node, the second packet to the second network node. The network performance parameter of the first network node is used by the second network node to calculate network performance.

According to the method, in a process in which the first network node forwards the packet using the segment list in the packet, the segment list is used to carry the network performance parameter of the first network node such that transmission of the network performance parameter is more convenient, and the network performance parameter of the first network node can be sent to the second network node when the first network node forwards the packet. The second network node may directly use the network performance parameter of the first network node to calculate the network performance such that calculation of the network performance is more flexible.

In a possible design, the network performance parameter includes a time at which the first network node sends the second packet, or the network performance parameter includes a quantity of service packets that correspond to a service identifier and that are received by the first network node before the first network node sends the second packet, and the service packets that correspond to the service identifier are forwarded along the path. The network performance parameter includes the time at which the first network node sends the second packet or the quantity of service packets received by the first network node such that a packet forwarding delay or a quantity of lost packets can be measured.

In a possible design, the network performance parameter of the first network node is added to the SID of the second network node. In a SRv6 technology, the segment list is used to specify a displayed forwarding path. When the first network node is an ingress node for forwarding a SRv6 network packet, the segment list may include no SID of the first network node. After the first network node replaces the destination address of the packet with an identifier of the next-hop segment node of the first network node in the segment list, the identifier of the next-hop segment node of the first network node in the segment list is no longer used in a subsequent forwarding process. Therefore, a SID field of the second network node in the segment list may be repeatedly used, and the network performance parameter of the first network node is added to the SID of the second network node such that sending of the network performance parameter is more convenient.

In a possible design, the network performance parameter of the first network node is stored between the $65^{th}$ bit and the $128^{th}$ bit of the SID of the second network node in the segment list.

In a possible design, the segment list may alternatively include a SID of the first network node. Therefore, the network performance parameter of the first network node may be added to the SID of the first network node.

In a possible design, the network performance parameter of the first network node is stored between the $65^{th}$ bit and the $128^{th}$ bit of the SID of the first network node in the segment list.

In a possible design, when the first network node determines that the destination address of the first packet is the SID of the first network node, and determines, based on a function part in the SID of the first network node, that the first network node needs to add the network performance parameter to the first packet, the first network node adds the network performance parameter of the first network node to the segment list.

In a possible design, the first packet that includes the segment list and that is obtained by the first network node is a service packet that corresponds to the service identifier.

According to a second aspect, an embodiment of the present disclosure provides a packet processing method. The method includes receiving, by a second network node, a packet that includes a segment list, where the segment list includes a SID of a network node on a path used to forward the packet, and a first SID in the segment list includes a first network performance parameter of the first network node, determining, by the second network node, that a destination address of the packet is a SID of the second network node, and calculating, by the second network node, network performance based on the first network performance parameter in response to the determining, by the second network node, that a destination address of the packet is a SID of the second network node.

According to the method, the second network node receives the network performance parameter that is of the first network node and that is carried in the segment list, and then calculates the network performance based on the network performance parameter of the first network node. Therefore, calculation of the network performance is more flexible. The network performance parameter of the first network node is carried using the segment list such that transmission of the network performance parameter is more convenient, and the network performance parameter of the first network node can be sent to the second network node when the first network node forwards the packet.

In a possible design, the first network performance parameter includes a first time at which the first network node sends the packet to the second network node, or the first network performance parameter includes a first quantity of service packets that correspond to a service identifier and that are received by the first network node before the first network node sends the packet, and the service packets that correspond to the service identifier are forwarded along the path. The service identifier may be a service label, an Internet Protocol (IP) address, or a combination of an IP address and a port number, or the service identifier corresponds to the segment list.

In a possible design, the calculating, by the second network node, network performance based on the first network performance parameter includes determining, by the second network node, a second time at which the second network node receives the packet, and determining that a forwarding delay of sending the packet from the first network node to the second network node is equal to a difference between the second time and the first time.

In a possible design, a second SID in the segment list includes a second network performance parameter of a third network node. The third network node is a network node between the first network node and the second network node on the path. The second network performance parameter includes a third time at which the third network node sends the packet to the second network node. The calculating, by the second network node, network performance based on the first network performance parameter includes determining, by the second network node, that a forwarding delay of forwarding the packet from the first network node to the third network node is equal to a difference between the third time and the first time.

In a possible design, the calculating, by the second network node, network performance based on the first network performance parameter includes determining, by the second network node, a second quantity of service packets that correspond to the service identifier and that are received by the second network node before the second network node receives the packet, and determining that a quantity of lost packets during forwarding of the service packets corresponding to the service identifier from the first network node to the second network node is equal to a difference between the second quantity and the first quantity.

In a possible design, a second SID in the segment list includes a second network performance parameter of a third network node. The second network performance parameter includes a third quantity of service packets that correspond to the service identifier and that are received by the third network node when the third network node forwards the packet. The calculating, by the second network node, network performance based on the first network performance parameter includes determining, by the second network node, that a quantity of lost packets during forwarding of the service packets corresponding to the service identifier from the first network node to the third network node is equal to a difference between the third quantity and the first quantity.

In a possible design, the first SID is the SID of the second network node.

In a possible design, the segment list includes a SID of the first network node. The first SID is the SID of the first network node.

In a possible design, the packet that includes the segment list and that is received by the second network node is a service packet that corresponds to the service identifier.

According to a third aspect, an embodiment of the present disclosure provides a first network node, to perform the method in any one of the first aspect or the possible implementations of the first aspect. Specifically, the first network node includes units configured to perform the method in any one of the first aspect or the possible implementations of the first aspect.

According to a fourth aspect, an embodiment of the present disclosure provides a second network node, to perform the method in any one of the second aspect or the possible implementations of the second aspect. Specifically, the second network node includes units configured to perform the method in any one of the second aspect or the possible implementations of the second aspect.

According to a fifth aspect, a first network node is provided. The first network node includes a processor, a network interface, and a memory. The memory may be configured to store program code, and the processor is configured to invoke the program code in the memory to perform the method in any one of the first aspect or the possible implementations of the first aspect. Details are not described herein again.

According to a sixth aspect, a second network node is provided. The second network node includes a processor, a network interface, and a memory. The memory may be configured to store program code, and the processor is configured to invoke the program code in the memory to perform the method in any one of the second aspect or the possible implementations of the second aspect. Details are not described herein again.

According to a seventh aspect, a first network node is provided. The first network node includes a main control board and an interface board. The main control board includes a first processor and a first memory. The interface board includes a second processor, a second memory, and an interface card. The main control board is coupled to the interface board. The first memory may be configured to store program code. The first processor is configured to invoke the program code in the first memory, to perform the following operations obtaining a first packet that includes a segment list, where the segment list includes a SID of a network node on a path used to forward the first packet, obtaining a SID of a second network node from the segment list, where the second network node is a next-hop segment node of the first network node on the path, and replacing a destination address of the first packet with the SID of the second network node, and adding a network performance parameter of the first network node to the segment list, to generate a second packet.

The second memory may be configured to store program code. The second processor is configured to invoke the program code in the second memory, to perform the following operation sending the second packet to the second network node.

According to an eighth aspect, a second network node is provided. The second network node includes a main control board and an interface board. The main control board includes a first processor and a first memory. The interface board includes a second processor, a second memory, and an interface card. The main control board is coupled to the interface board. The second memory may be configured to store program code. The second processor is configured to invoke the program code in the second memory, to perform the following operation receiving a packet that includes a segment list and is sent by a first network node, where the segment list includes a SID of a network node on a path used to forward the packet, and a first SID in the segment list includes a first network performance parameter of the first network node. The first memory may be configured to store program code. The first processor is configured to invoke the program code in the first memory, to perform the following operations determining that a destination address of the packet is a SID of the second network node, and calculating network performance based on the first network performance parameter.

In a possible implementation, an inter-process communication (IPC) control channel is established between the main control board and the interface board.

According to a ninth aspect, a service packet processing system is provided. The system includes the first network node and the second network node according to the foregoing aspects.

According to a tenth aspect, a computer storage medium is provided. The computer storage medium is configured to store a computer software instruction used by the foregoing first network node or second network node. The computer software instruction includes a program designed for performing the foregoing aspects.

BRIEF DESCRIPTION OF DRAWINGS

To describe the technical solutions in the present disclosure more clearly, the following briefly describes the accompanying drawings used in the embodiments. It is clear that the accompanying drawings in the following description merely show some embodiments of the present disclosure, and a person of ordinary skill in the art can derive other technical solutions and accompanying drawings of the present disclosure from these accompanying drawings without creative efforts.

DESCRIPTION OF EMBODIMENTS

The following describes the embodiments of the present disclosure with reference to accompanying drawings.

In a process of forwarding a packet in a SRv6 network, an ingress device for forwarding the packet in the SRv6 network adds a segment routing header (SRH) to the packet. The SRH includes a segment list used to identify a forwarding path. The segment list includes an IPv6 address of a network node on the path used to forward the packet. The ingress device for forwarding the packet in the SRv6 network may also be referred to as an ingress node or an ingress provider edge (PE) device. In a SRv6 technology, the IPv6 address of the network node in the segment list may also be referred to as a SID of the network node. The segment list may also be referred to as a path SID list. The SID occupies 128 bits (bit). The SID includes two parts a locator and a function. The locator is used to route the packet to the network node corresponding to the SID. For example, the locator includes first 64 bits of the IPv6 address of the network node. A forwarding node may forward, based on the locator, the packet to the network node corresponding to the locator. The function is used to instruct the network node corresponding to the SID to perform a corresponding function. For example, when the network node receives the packet, if the network node determines that a destination address of the packet is an address of the network node, namely, the SID of the network node, the network node performs the corresponding function based on the function in the SID. For definitions of the segment list and the SID, refer to a SRv6-related draft disclosed by the Internet Engineering Task Force (IETF), for example, draft-filsfils-spring-srv6-network-programming-02.

A controller mentioned in the embodiments of the present disclosure may be a network management device or a controller in an SDN architecture. The network node in the embodiments of the present disclosure may be a network device, for example, a router, a switch, or a forwarder in an SDN network.

Figure 1:
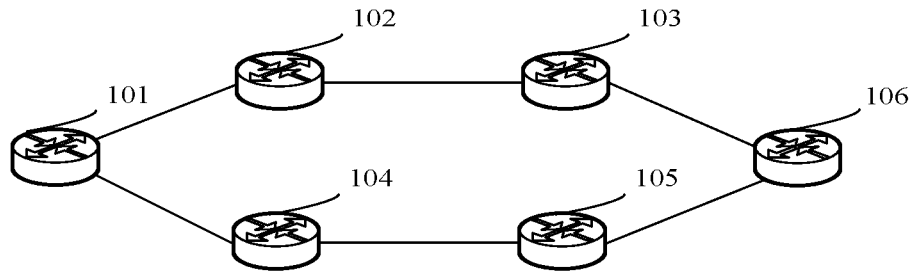
FIG. 1 is a schematic diagram of an application scenario of a packet processing method according to an embodiment of the present disclosure.

FIG. 1 is a schematic diagram of a possible application scenario according to an embodiment of the present disclosure. The application scenario includes a network node supporting an SRv6 function, for example, a network node 101, a network node 102, a network node 103, a network node 104, a network node 105, and a network node 106. In an SRv6 network, that a network node supports the SRv6 function means that the network node supports a SR function. A SID of the network node 101 is an SID 1. The SID 1 is an IPv6 address of the network node 101, for example, A::. A SID of the network node 102 is an SID 2. The SID 2 is an IPv6 address of the network node 102, for example, B::. A SID of the network node 103 is an SID 3. The SID 3 is an IPv6 address of the network node 103, for example, C::. A SID of the network node 106 is an SID 6. The SID 6 is an IPv6 address of the network node 106, for example, D::. When a packet is forwarded from the network node 101 to the network node 106, the network node 101 may be referred to as an ingress node of the SRv6 network and the network node 106 may be referred to as an egress node of the SRv6 network.

In the SRv6 network, network performance of the SRv6 network is usually measured based on a cross coloring solution for a flow label. In this solution, 2 bits of a flow label in a packet header of an IPv6 packet is used to color consecutive data packets. Different data packets are distinguished using different values of 2 bits of flow labels. This is vividly referred to as coloring. With reference to FIG. 1, the network node 101 assigns 1 to first bits of flow labels of 100 consecutive data packets, and colors of the 100 data packets are the same. Then, the network node 101 assigns 0 to first bits of flow labels of 100 subsequent data packets, and colors of the 100 data packets are a second color. When a color of a data packet received by the network node 106 changes, that is, when values of first bits of flow labels of two adjacent data packets are different, the network node 106 may record a network performance parameter. For example, a time at which a data packet is received is recorded or a quantity of received data packets that belong to a same color is recorded. To measure performance, network performance parameters of network nodes further need to be synchronized. For example, a controller collects the network performance parameters of the nodes, and then measures network performance. For example, the network node 101 records a quantity of packets that are sent by the network node 101 and whose flow labels have first bits with a value 1, and sends the quantity of packets to the controller. The network node 106 records a quantity of packets that are received by the network node 106 and whose flow labels have first bits with a value 1, and also sends the quantity of packets to the controller. The controller performs packet loss detection based on the quantity of packets that is sent by the network node 101 and the quantity of packets that is received by the network node 106. In the foregoing method for measuring the network performance, the network nodes need to separately send the network performance parameters to the controller. Therefore, a forwarding channel needs to be established between each network node and the controller in advance using a specific protocol. The solution is complex to be implemented, and is not conducive to solution extension.

The embodiments of the present disclosure provide a packet processing method, and a network node and a system that are based on the method. The method, the network node, and the system are based on a same concept. Problem-resolving principles of the method, the network node, and the system are similar. Therefore, for embodiments of the network node, the method, and the system, reference may be made to each other. Same content is not described again.

Figure 2:
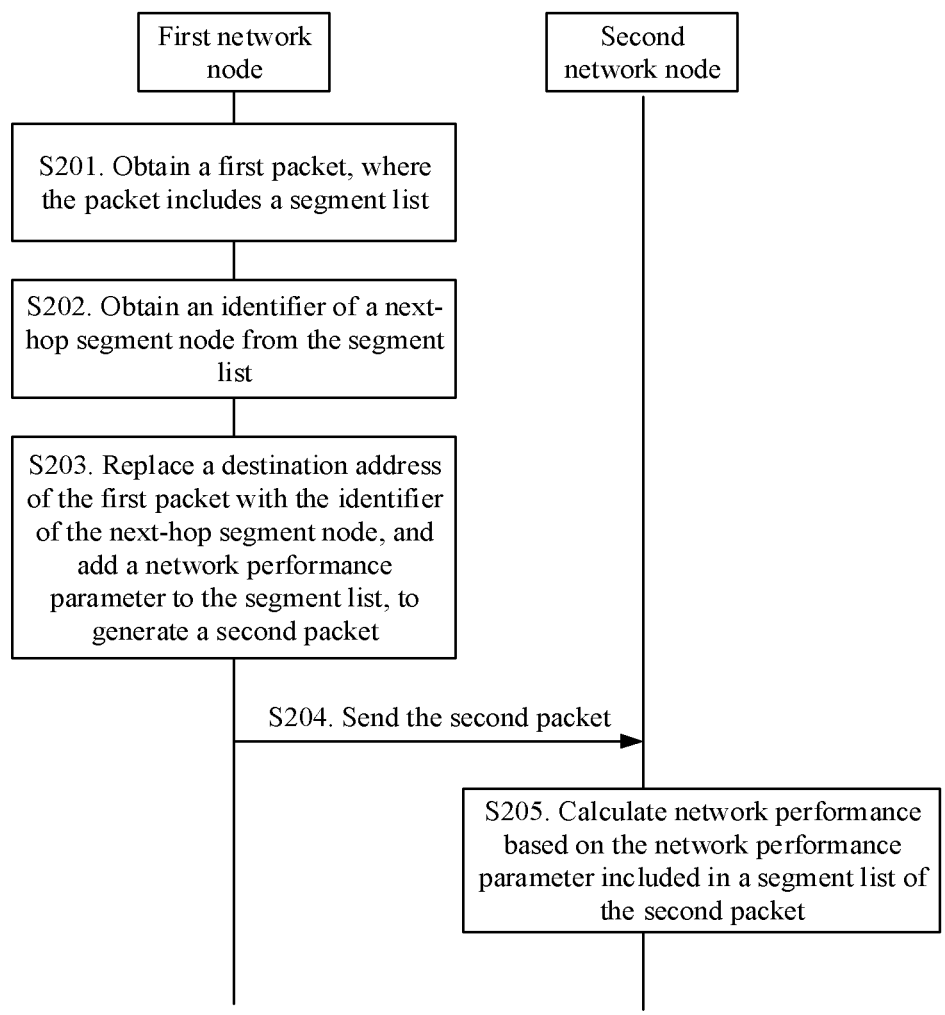
FIG. 2 is a schematic flowchart of a packet processing method according to an embodiment of the present disclosure.

With reference to the application scenario shown in FIG. 1, referring to FIG. 2, an embodiment of the present disclosure provides a packet processing method. The method includes the following steps.

S201. A first network node obtains a first packet including a segment list. The segment list includes a SID of a network node on a path used to forward the first packet.

An example in which the first network node is the network node 101 in FIG. 1 is used for description. In the application scenario shown in FIG. 1, there are two paths from the network node 101 to the network node 106. Network nodes through which a first path passes include the network node 102, the network node 103, and the network node 106. Network nodes through which a second path passes include the network node 104, the network node 105, and the network node 106. The network node 101 obtains a segment list for the first path. SIDs in the segment list may be arranged in a reversed order of the network nodes through which the packet passes on the first path. For example, the segment list is <SID 6, SID 3, and SID 2>. Alternatively, SIDs in the segment list may be arranged in a positive order of the network nodes through which the packet passes on the first path. For example, the segment list is <SID 2, SID 3, and SID 6>. The segment list may be generated by the network node 101 in advance, or may be obtained from a controller. The network node 101 obtains a correspondence between a destination address of the first packet and the segment list. For example, if the destination address of the first packet is D::, the first network node obtains a correspondence between the address D:: and the segment list <SID 2, SID 3, and SID 6>. The correspondence may be pre-stored in the network node 101, or may be stored in another network node. For example, the correspondence may be pre-stored in the controller. When the network node 101 receives the first packet, the network node 101 obtains the correspondence from the controller. In this example, the network node 101 obtains a next-hop segment node of the network node 101 using the segment list such that the network node 101 may forward the packet to the network node 106 along the first path. Therefore, the segment list may include no SID of the network node 101. Optionally, the segment list may alternatively include a SID of the network node 101. For example, the segment list may be <SID 6, SID 3, SID 2, and SID 1>, or <SID 1, SID 2, SID 3, and SID 6>.

S202. The first network node obtains a SID of a second network node from the segment list. The second network node is a next-hop segment node of the first network node on the path. The next-hop segment node of the first network node is a network node that supports a SR function and that is closest to the first network node in a packet forwarding direction on the path.

For example, the segment list may be stored in a memory of the first network node in a form of a data structure. The data structure may be an array, a linked list, or a structure. For example, when the data structure is the array, the SID 1 may be a first member in the array, and the SID 2 may be a second member in the array. A processor of the first network node may perform a read operation on the second member in the array stored in the memory, to obtain the SID 2 from the memory.

S203. The first network node replaces the destination address of the first packet with the SID of the second network node, and adds a network performance parameter of the first network node to the segment list, to generate a second packet. That the first network node replaces the destination address of the first packet with the SID of the second network node means updating a value of a destination address field of the first packet to the SID of the second network node. Because the SID of the second network node is an IPv6 address of the second network node, that the first network node replaces the destination address of the first packet with the SID of the second network node means replacing the destination address of the first packet with the IPv6 address of the second network node.

In an example, that the first network node obtains the first packet means that the first network node generates the first packet. For example, the first network node is the network node 101 in the scenario shown in FIG. 1, the second network node is the network node 102, and the first network node is an ingress node on the path for forwarding the first packet. When the network node 101 needs to send an IPv6 packet to the network node 106, the network node 101 searches the segment list based on an IPv6 address D:: of the network node 106, and then inserts an SRH between an IPv6 packet header of the IPv6 packet and a packet payload. The SRH includes the segment list <SID 6, SID 3, and SID 2>. The network node 101 obtains a SID of a next-hop segment node of the network node 101 from the segment list, namely, the segment node identifier SID 2 of the network node 102, and then replaces the destination address (DA) of the first packet with the SID 2, in other words, replaces the value of the destination address field of the first packet with the SID 2.

In an example, the first packet is a packet received by the first network node from terminal equipment. For example, the first network node is the network node 101 in the scenario shown in FIG. 1, the second network node is the network node 102. The network node 101 is further connected to source user equipment, the network node 106 is connected to target user equipment, and the source user equipment and the target user equipment may not support a SR function. When the source user equipment needs to send a packet to the target user equipment, the source user equipment generates a user packet whose destination address is an address of the target user equipment, and then sends the user packet to the network node 101. The network node 101 serves as an ingress node for forwarding the user packet in the SRv6 network, and inserts an SRH into the user packet, to generate the first packet. The SRH includes a segment list <IPv6 address, SID 6, SID 3, and SID 2>. The IPv6 address is an IPv6 address of the target user equipment. In another case of this example, if the source user equipment needs to send the packet to only the network node 106, for example, the network node 106 is a server device, the segment list is <SID 6, SID 3, and SID 2>.

In an example, the first packet is a packet received by the first network node from another network node that supports a SR function. For example, the first network node is the network node 102 in the scenario shown in FIG. 1, and the second network node is the network node 103, and the first network node is an intermediate node in a process of forwarding the first packet. The first network node receives the first packet from the network node 101 in FIG. 1. As an ingress node for forwarding the first packet, the network node 101 has added an SRH to the first packet. The SRH includes a segment list <SID 6, SID 3, and SID 2>.

In an example, the first network node may add the network performance parameter to the SID of the second network node in the segment list. For example, when the first network node is the network node 101 in the scenario shown in FIG. 1, and the second network node is the network node 102, the network performance parameter of the first network node is stored in the SID 2 in the segment list <SID 6, SID 3, and SID 2>. Because each SID includes two parts a locator and a function, after the value of the destination address field of the first packet is replaced with the SID 2, the SID 2 in the segment list can be repeatedly used. For example, the network performance parameter of the first network node is stored in the function part of the SID 2, and when the function part occupies the $65^{th}$ bit to the $128^{th}$ bit of the SID 2, the network performance parameter of the first network node is stored between the $65^{th}$ bit and the $128^{th}$ bit of the SID 2. In this example, the locator may occupy any quantity of bits in only the $1^{st}$ bit to the $64^{th}$ bit of the SID, and correspondingly, the function occupies bits other than the bits occupied by the locator in the SID. For example, the locator occupies the $1^{st}$ bit to the $50^{th}$ bit of the SID, and the function may occupy the $51^{st}$ bit to the $128^{th}$ bit of the SID. Optionally, the function may alternatively occupy only the $90^{th}$ bit to the $128^{th}$ bit of the SID.

In an example, when the first network node is the network node 101 in the scenario shown in FIG. 1, the second network node is the network node 102, and the segment list further includes a SID of the first network node, for example, the segment list is <SID 6, SID 3, SID 2, and SID 1>, the first network node may add the network performance parameter of the first network node to the SID of the first network node in the segment list, for example, store the network performance parameter of the first network node in the SID 1 in the segment list <SID 6, SID 3, SID 2, and SID 1>.

In an example, when the first network node is the network node 101 in the scenario shown in FIG. 1, the second network node is the network node 102, and the segment list includes no SID of the first network node, for example, the segment list is <SID 6, SID 3, and SID 2>, the first network node may add the network performance parameter of the first network node to another field of the first packet, for example, an ingress node type-length-value (TLV) field. Another network node may store a corresponding network performance parameter in a corresponding SID. For example, a network performance parameter of the second network node is stored in the SID 2 in the segment list <SID 6, SID 3, and SID 2>.

S204. The first network node sends the second packet to the second network node.

S205. The second network node receives the second packet, and when determining that a value of a destination address field of the second packet is the SID of the second network node, obtains the network performance parameter of the first network node in the segment list, and calculates network performance based on the network performance parameter of the first network node.

In an example, the network performance parameter of the first network node includes a first time at which the first network node sends the second packet. Alternatively, the network performance parameter of the first network node includes a first quantity of service packets that correspond to a service identifier and that are received by the first network node before the first network node sends the second packet, and the service packets that correspond to the service identifier are forwarded along the path.

The second network node may calculate the network performance based on the network performance parameter of the first network node in one or more of the following manners.

In a first manner, a forwarding delay is calculated.

The second network node determines a second time at which the second network node receives the first packet, and then determines that a forwarding delay of sending the packet from the first network node to the second network node is a difference between the second time and the first time.

In a second manner, a quantity of lost packets is calculated.

The second network node determines a second quantity of service packets that correspond to the service identifier and that are received by the second network node before the second network node receives the packet. The second network node determines a quantity of lost packets during forwarding of the service packets corresponding to the service identifier from the first network node to the second network node. The quantity of lost packets is equal to a difference between the second quantity and the first quantity.

According to the method, in a process in which the first network node forwards the packet using the segment list in the packet, the segment list is used to carry the network performance parameter of the first network node such that transmission of the network performance parameter is more convenient, and the network performance parameter of the first network node can be sent to the second network node when the first network node forwards the packet. The second network node may directly use the network performance parameter of the first network node to calculate the network performance such that calculation of the network performance is more flexible.

Figure 3:
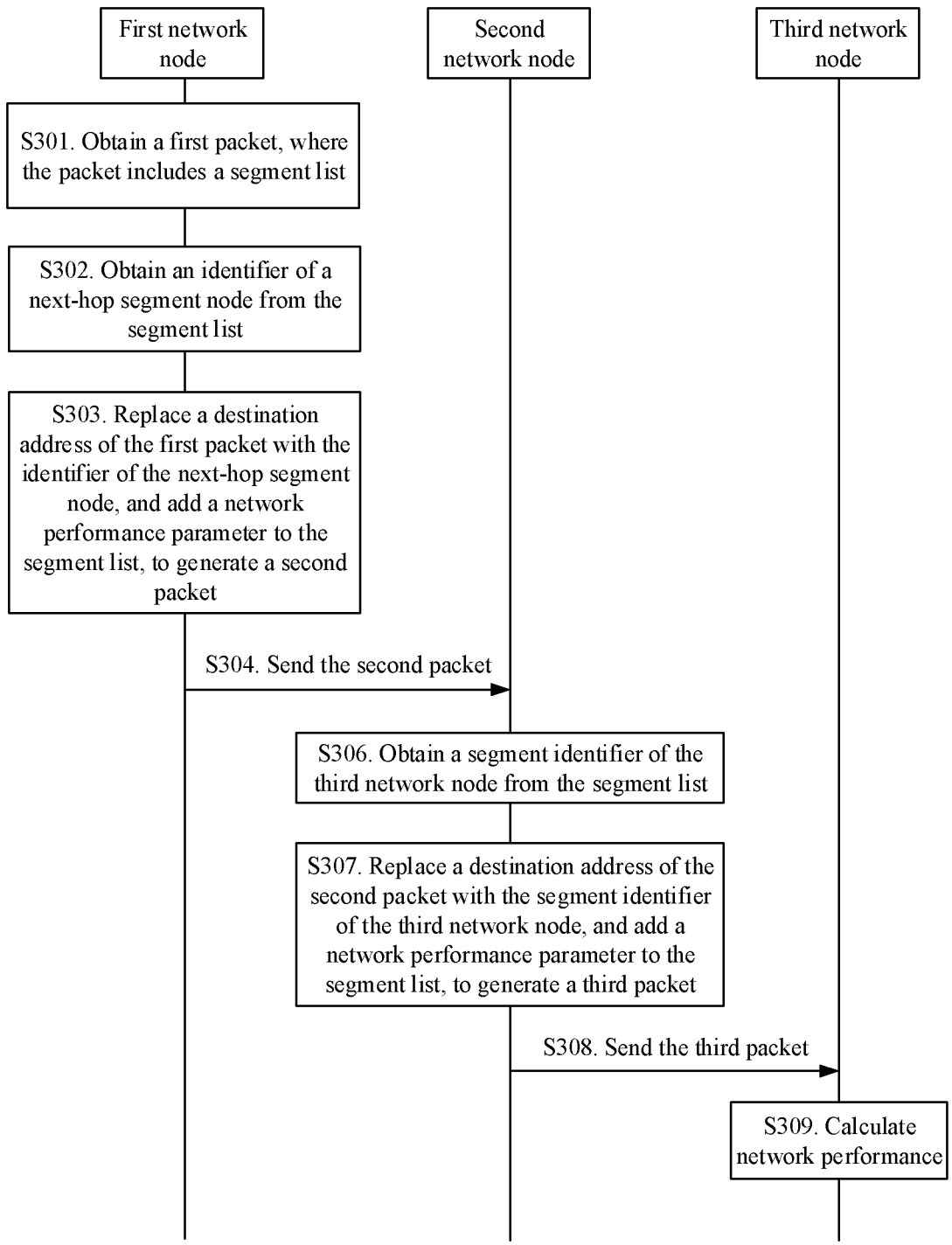
FIG. 3 is a schematic flowchart of a packet processing method according to an embodiment of the present disclosure.

With reference to the application scenario shown in FIG. 1, referring to FIG. 3, an embodiment of the present disclosure provides a packet processing method. The method includes the following steps.

S301. A first network node obtains a first packet including a segment list. The segment list includes a SID of a network node on a path used to forward the first packet.

S302. The first network node obtains a SID of a second network node from the segment list. The second network node is a next-hop segment node of the first network node on the path.

S303. The first network node replaces a destination address of the first packet with the SID of the second network node, and adds a network performance parameter of the first network node to the segment list, to generate a second packet.

S304. The first network node sends the second packet to the second network node.

In this embodiment of the present disclosure, steps S301, S302, S303, and S304 are the same as steps S201, S202, S203, and S204 in FIG. 2. For detailed content, refer to the embodiment shown in FIG. 2. Details are not described herein again.

S306. When determining that a value of a destination address field of the second packet is the SID of the second network node, the second network node obtains a SID of a third network node from the second packet. The third network node is a next-hop segment node of the second network node on the path.

S307. The second network node replaces a destination address of the second packet with the SID of the third network node, and adds a network performance parameter of the second network node to the segment list, to generate a third packet.

In an example, the network performance parameter of the second network node includes a second time at which the second network node sends the packet to the third network node. Alternatively, the network performance parameter of the second network node includes a second quantity of service packets that correspond to a service identifier and that are received by the second network node when the second network node forwards the third packet.

S308. The second network node sends the third packet to the third network node.

S309. The third network node receives the third packet, and when determining that a value of a destination address field of the third packet is the SID of the third network node, the third network node calculates network performance.

The third network node may measure the network performance in one or more of the following manners.

A first manner of calculating a forwarding delay is as follows.

The third network node determines that a forwarding delay of forwarding the third packet from the first network node to the second network node is equal to a difference between the second time and a first time.

A second manner of calculating a forwarding delay is as follows.

The third network node determines a third time at which the third network node receives the third packet, and then determines that a forwarding delay of sending the third packet from the second network node to the third network node is equal to a difference between the third time and the second time.

A third manner of calculating a forwarding delay is as follows.

The third network node determines a third time at which the third network node receives the third packet, and then determines that a forwarding delay of sending the third packet from the first network node to the third network node is equal to a difference between the third time and the first time.

A first manner of calculating a quantity of lost packets is as follows.

The third network node determines that a quantity of lost packets during forwarding of the service packets corresponding to the service identifier from the first network node to the second network node is equal to a difference between the second quantity and a first quantity.

A second manner of calculating a quantity of lost packets is as follows.

The third network node determines a third quantity of service packets that correspond to the service identifier and that are received by the third network node before the third network node receives the third packet, and then determines that a quantity of lost packets during forwarding of the service packets corresponding to the service identifier from the second network node to the third network node is equal to a difference between the third quantity and the second quantity.

A third manner of calculating a quantity of lost packets is as follows.

The third network node determines a third quantity of service packets that correspond to the service identifier and that are received by the third network node before the third network node receives the third packet, and then determines a quantity of lost packets during forwarding of the service packets corresponding to the service identifier from the first network node to the third network node. The quantity of lost packets is equal to a difference between the third quantity and the first quantity.

Figure 4:
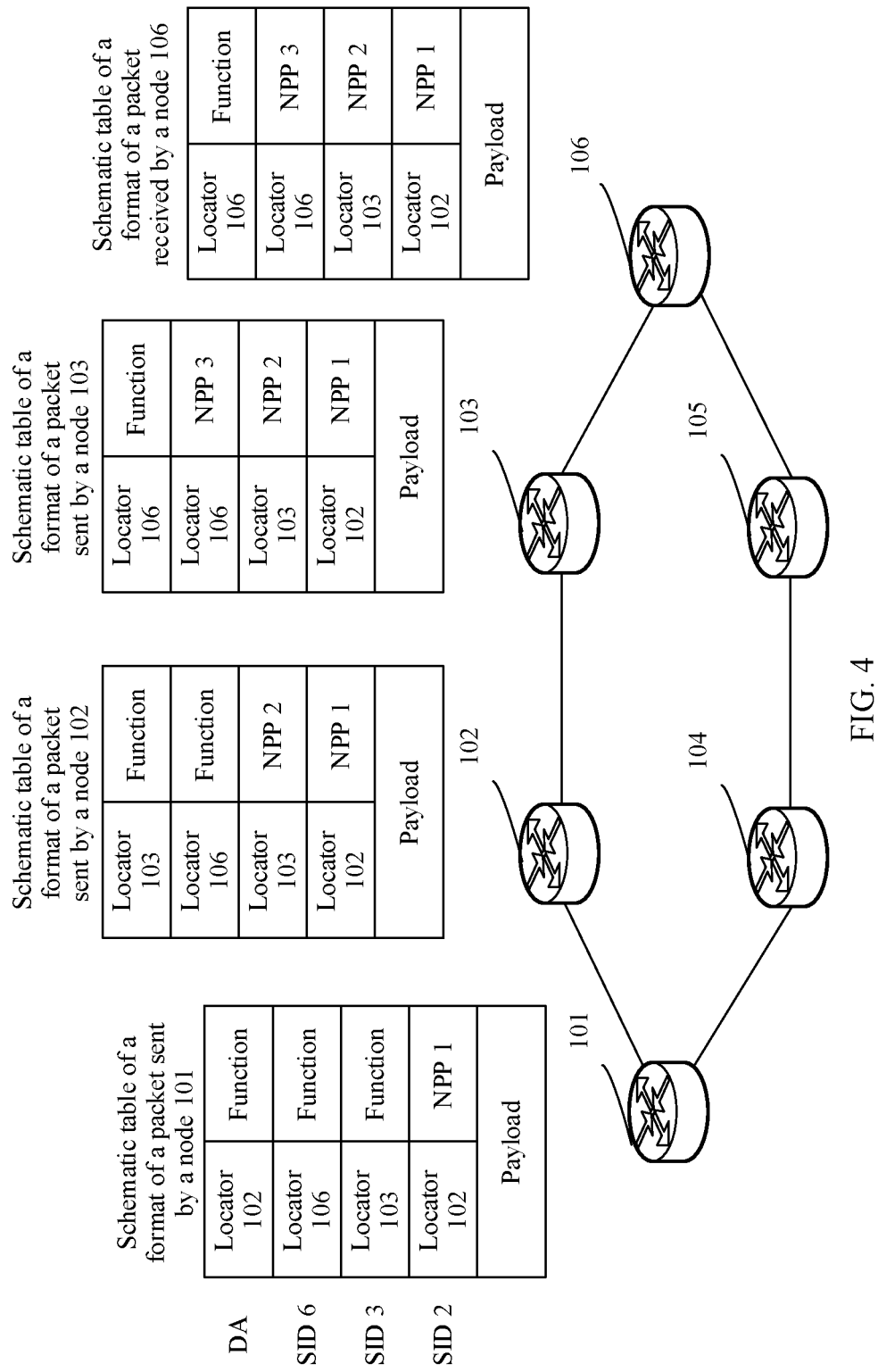
FIG. 4 is a schematic diagram of packet forwarding based on the application scenario shown in FIG. 1 according to an embodiment of the present disclosure.
Figure 5:
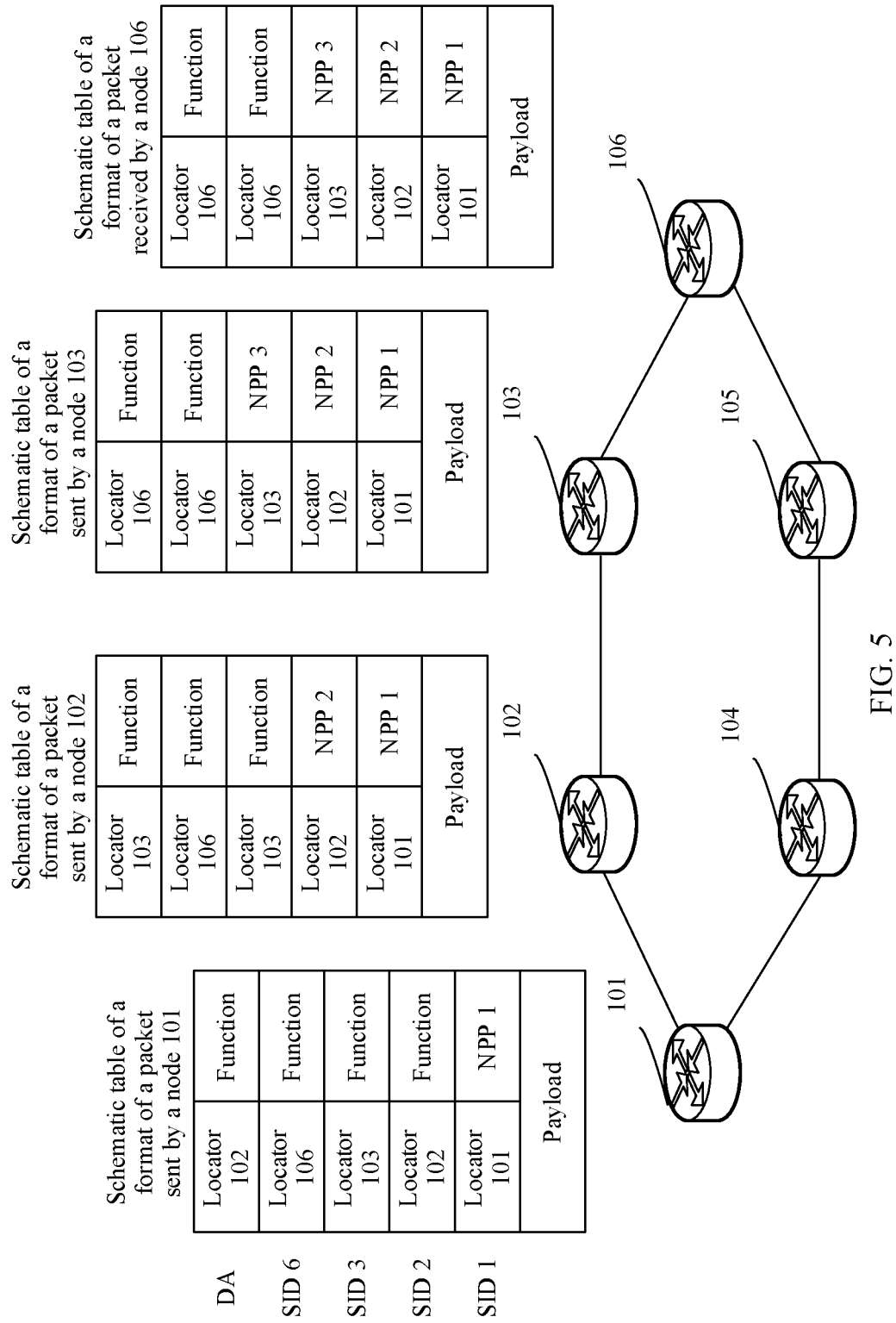
FIG. 5 is a schematic diagram of packet forwarding based on the application scenario shown in FIG. 1 according to an embodiment of the present disclosure.
Figure 6:
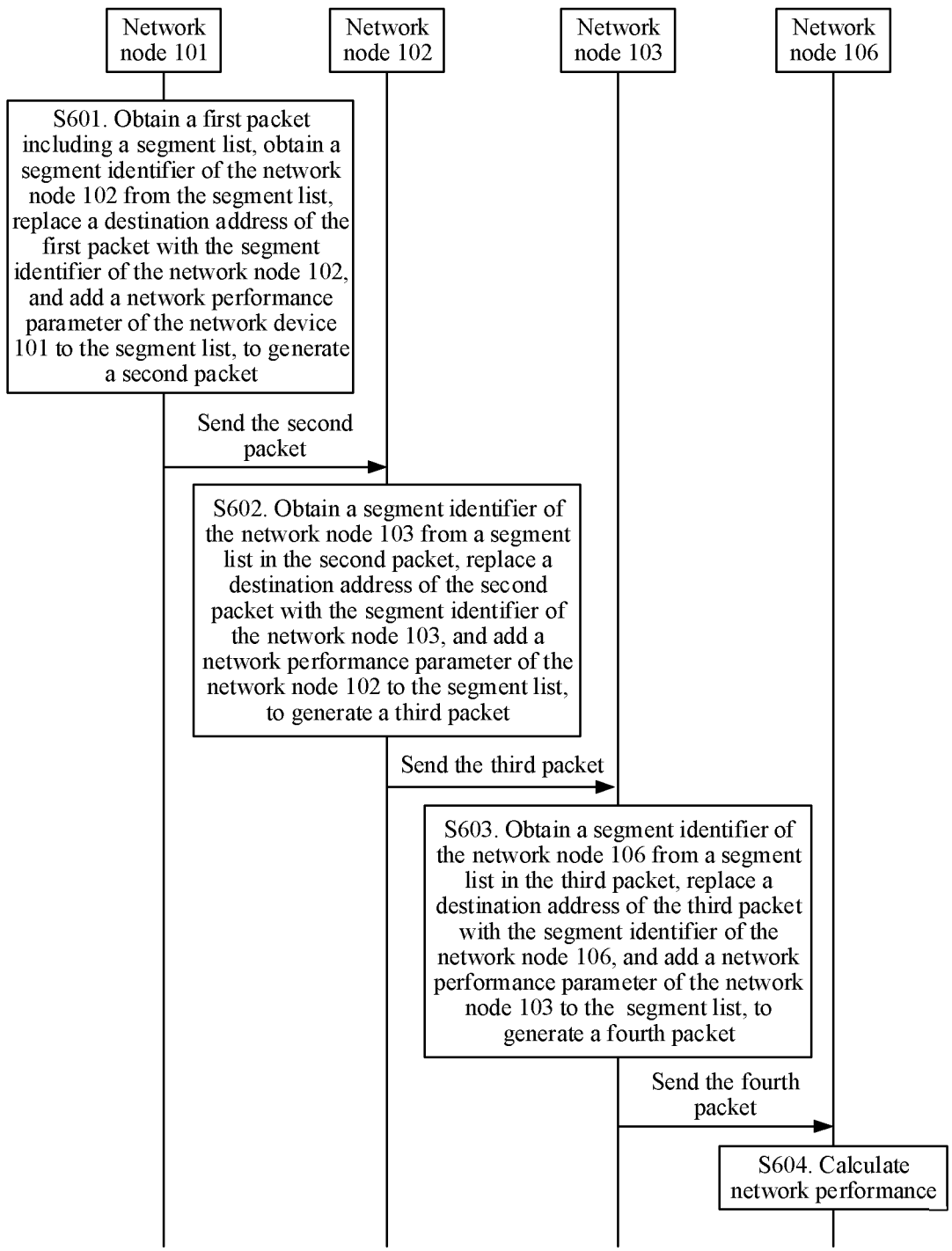
FIG. 6 is a schematic flowchart of a packet processing method according to an embodiment of the present disclosure.

Referring to FIG. 4, FIG. 5, and FIG. 6, an embodiment of the present disclosure provides a packet processing method. FIG. 4 and FIG. 5 are schematic diagrams of forwarding a packet in the application scenario shown in FIG. 1. FIG. 6 is a schematic flowchart of a packet processing method according to an embodiment of the present disclosure. Referring to FIG. 6, the method includes the following steps.

S601. A network node 101 obtains a first packet to be sent to a network node 106. The first packet includes an IPv6 packet header, an SRH, and a payload, as shown in a schematic table of a packet format in FIG. 4. The network node 101 replaces a destination address of the first packet with an SID 2, adds a network performance parameter of the network node 101 to a segment list to generate a second packet, and sends the second packet to a network node 102.

In an example, the SRH includes a segment list <SID 6, SID 3, and SID 2>, and the network performance parameter (NPP) of the network node 101 is included in the SID 2 in the segment list of the first packet. As shown in FIG. 4, a network performance parameter NPP 1 value of the network node 101 is stored in a function field of the SID 2. In other words, the value of an NPP 1 is stored in the function field of the SID 2.

In an example, the SRH includes a segment list <SID 6, SID 3, SID 2, and SID 1>. A network performance parameter NPP 1 of the network node 101 is included in an SID 1 in the segment list of the first packet. As shown in FIG. 5, the NPP 1 is included in a function field of the SID 1.

S602. The network node 102 receives the second packet, and when determining that a value of a destination address field of the second packet is the SID 2, the network node 102 obtains the SID 3 from a segment list of the second packet, and replaces a destination address of the second packet with the SID 3. When determining that a function corresponding to the function field in the SID 2 is to insert a network performance parameter, the network node 102 adds a network performance parameter of the network node 102 to the segment list to generate a third packet, and sends the third packet to a network node 103.

In an example, the SRH includes the segment list <SID 6, SID 3, and SID 2>. A network performance parameter NPP 2 of the network node 102 is stored in the SID 3 in the segment list. As shown in FIG. 4, the NPP 2 is stored in a function field of the SID 3.

In an example, the SRH includes the segment list <SID 6, SID 3, SID 2, and SID 1>. A network performance parameter NPP 2 of the network node 102 is stored in the SID 2 in the segment list. As shown in FIG. 5, the NPP 2 is stored in the function field of the SID 2.

In an example, the network node 101 is the first network node in the embodiment shown in FIG. 2. The network node 102 may be the second network node in the embodiment shown in FIG. 2. The network node 102 may measure network performance based on the network performance parameter in the segment list. For a specific manner of calculating the network performance, refer to the embodiment shown in FIG. 2. Details are not described herein again.

S603. The network node 103 receives the third packet, and when determining that a value of a destination address field of the third packet is the SID 3, the network node 103 obtains the SID 6 from a segment list in the third packet, and replaces a destination address of the third packet with the SID 6. When determining that a function corresponding to the function field in the SID 3 is to insert a network performance parameter, the network node 103 stores a network performance parameter of the network node 103 in the segment list to generate a fourth packet, and sends the fourth packet to the network node 106.

A meaning of a network performance parameter of a network node in this embodiment of the present disclosure is similar to that of the network performance parameter in the embodiment shown in FIG. 2 or FIG. 3. Details are not described herein again.

In an example, the SRH includes the segment list <SID 6, SID 3, and SID 2>. A network performance parameter NPP 3 of the network node 103 is stored in the SID 6 in the segment list. As shown in FIG. 4, the NPP 2 is stored in a function field of the SID 6.

In an example, the SRH includes the segment list <SID 6, SID 3, SID 2, and SID 1>. A network performance parameter NPP 3 of the network node 103 is stored in the SID 3 in the segment list. As shown in FIG. 5, the NPP 3 is stored in a function field of the SID 3.

In an example, the network node 101 is the first network node in the embodiment shown in FIG. 3, the network node 102 is the second network node in the embodiment shown in FIG. 3, and the network node 103 is the third network node in the embodiment shown in FIG. 3. The network node 103 may measure network performance based on the network performance parameter in the segment list. For a specific manner of calculating the network performance, refer to the embodiment shown in FIG. 3. Details are not described herein again.

S604. The network node 106 receives the fourth packet, and when determining that a value of a destination address field of the fourth packet is the SID 6, measures network performance based on the network performance parameter in the segment list.

In an example, when the segment list is <SID 6, SID 3, and SID 2>, referring to FIG. 4, a network performance parameter of each network node is stored in a SID of a next-hop segment node corresponding to the network node. For example, the network performance parameter NPP 1 of the network node 101 is stored in the SID 2 of the network node 102, the network performance parameter NPP 2 of the network node 102 is stored in the SID 3 of the network node 103, and the network performance parameter NPP 3 of the network node 103 is stored in the SID 6 of the network node 106. When the segment list is <SID 6, SID 3, SID 2, and SID 1>, referring to FIG. 5, a network performance parameter of each network node is stored in a SID of the network node. For example, the network performance parameter NPP 1 of the network node 101 is stored in the SID 1 of the network node 101, the network performance parameter NPP 2 of the network node 102 is stored in the SID 2 of the network node 102, and the network performance parameter NPP 3 of the network node 103 is stored in the SID 3 of the network node 103. After the network node 106 receives the fourth packet, because the network node 106 is the last segment node indicated by the segment list, a network performance parameter of the network node 106 does not need to be added to the segment list, and network performance needs to be calculated based on only the network performance parameter of each network node in the segment list.

In an example, the network node 106 is further connected to user equipment, a destination of the fourth packet is the user equipment, a segment list included in the SRH is <IPv6 address, SID 6, SID 3, and SID 2> or <IPv6 address, SID 6, SID 3, SID 2, and SID 1>. The IPv6 address is an IPv6 address of the user equipment. The network node 101 stores a correspondence between the IPv6 address of the user equipment and the segment list. The network node 106 deletes the SRH from the fourth packet, and modifies a destination address of the fourth packet to the IPv6 address of the user equipment to generate a fifth packet. Then, the network node 106 sends the fifth packet to the user equipment.

In an example, the network node 101 is the first network node in the embodiment shown in FIG. 3, the network node 102 or the network node 103 is the second network node in the embodiment shown in FIG. 3, and the network node 106 may be the third network node in the embodiment shown in FIG. 3. For a specific network performance measurement manner, refer to the embodiment shown in FIG. 3. Details are not described herein again.

Figure 7:
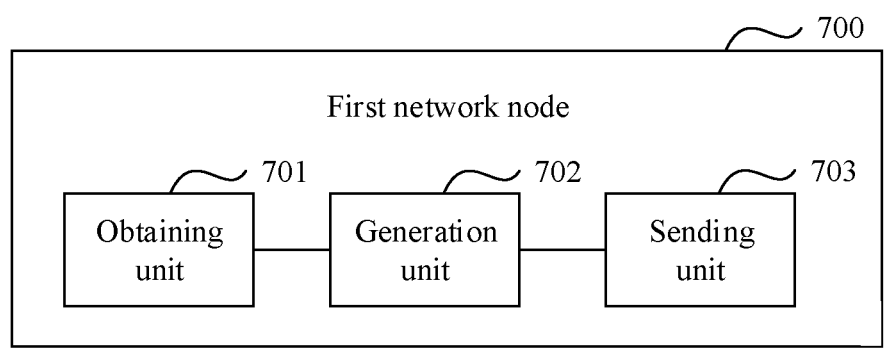
FIG. 7 is a schematic structural diagram of a first network node according to an embodiment of the present disclosure.

FIG. 7 is a possible schematic structural diagram of a first network node 700 in the foregoing embodiments. The first network node may implement a function of the first network node in the embodiment shown in FIG. 2, FIG. 3, or FIG. 6. Referring to FIG. 7, the first network node 700 includes an obtaining unit 701, a generation unit 702, and a sending unit 703. These units may perform corresponding functions in the foregoing method example. For example, the obtaining unit 701 is configured to obtain various information obtained by the first network node in the foregoing method embodiments. The generation unit 702 generates various information generated by the first network node in the foregoing method embodiments. The sending unit 703 is configured to send various information sent by the first network node in the foregoing method embodiments. For example, the obtaining unit 701 is configured to obtain a first packet including a segment list, where the segment list includes a SID of a network node on a path used to forward the first packet, and obtain a SID of a second network node from the segment list, where the second network node is a next-hop segment node of the first network node on the path. The generation unit 702 is configured to replace a destination address of the first packet with the SID of the second network node, and add a network performance parameter of the first network node to the segment list, to generate a second packet. The sending unit 703 is configured to send the second packet to the second network node.

Figure 8:
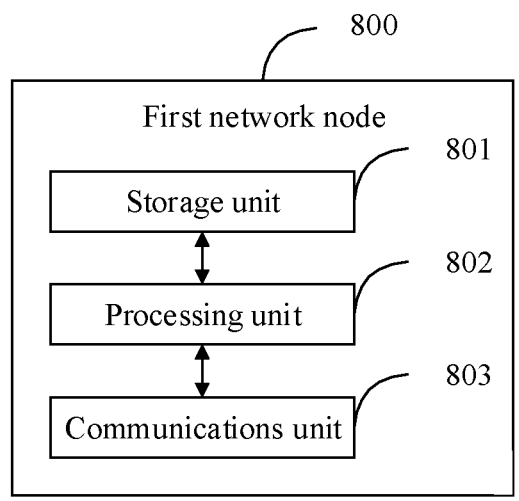
FIG. 8 is a schematic structural diagram of a first network node according to an embodiment of the present disclosure.

When an integrated unit is used, FIG. 8 is another possible schematic structural diagram of the first network node in the foregoing embodiments. The first network node 800 may also implement a function of the first network node in the embodiment shown in FIG. 2, FIG. 3, or FIG. 6.

The first network node 800 includes a storage unit 801, a processing unit 802, and a communications unit 803. The processing unit 802 is configured to control and manage an action of the first network node 800. For example, the processing unit 802 is configured to support the first network node 800 in performing the processes S201, S202, and S203 in FIG. 2, the processes S301, S302, and S303 in FIG. 3, the process S601 in FIG. 6, and/or another process in the technology described in this specification. The communications unit 803 is configured to support communication between the first network node 800 and another network entity, for example, communication with the second network node or the network node 102 shown in FIG. 2, FIG. 3, or FIG. 5. The storage unit 801 is configured to store program code and data of the first network node 800.

The processing unit 802 may be a processor, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the embodiments of the present disclosure. Alternatively, the processor may be a combination for implementing a computing function, for example, a combination of one or more microprocessors, or a combination of a DSP and a microprocessor. The communications unit 803 may be a transceiver, and the storage unit 801 may be a memory.

Figure 9:
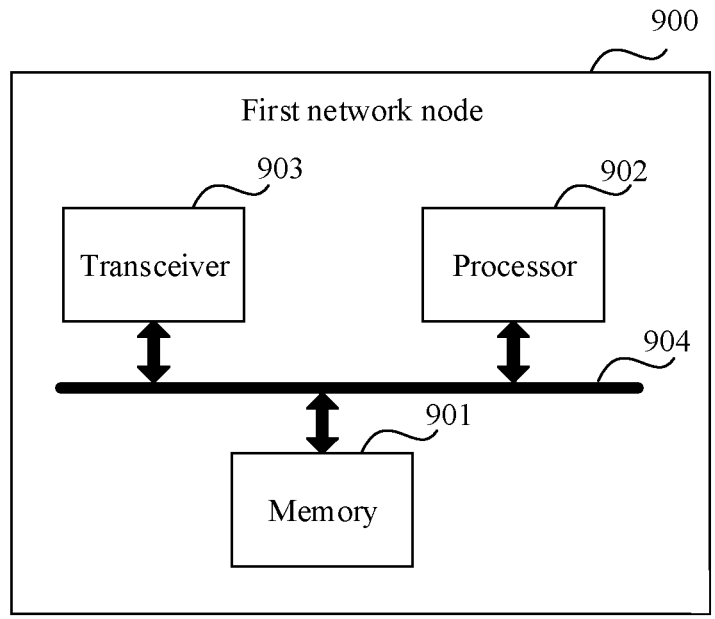
FIG. 9 is a schematic structural diagram of a first network node according to an embodiment of the present disclosure.

When the processing unit 802 is the processor, the communications unit 803 is the transceiver, and the storage unit 801 is the memory, the first network node in this embodiment of the present disclosure may be a first network node 900 shown in FIG. 9.

Referring to FIG. 9, the first network node 900 includes a processor 902, a transceiver 903, a memory 901, and a bus 904. The transceiver 903, the processor 902, and the memory 901 are connected to each other using the bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
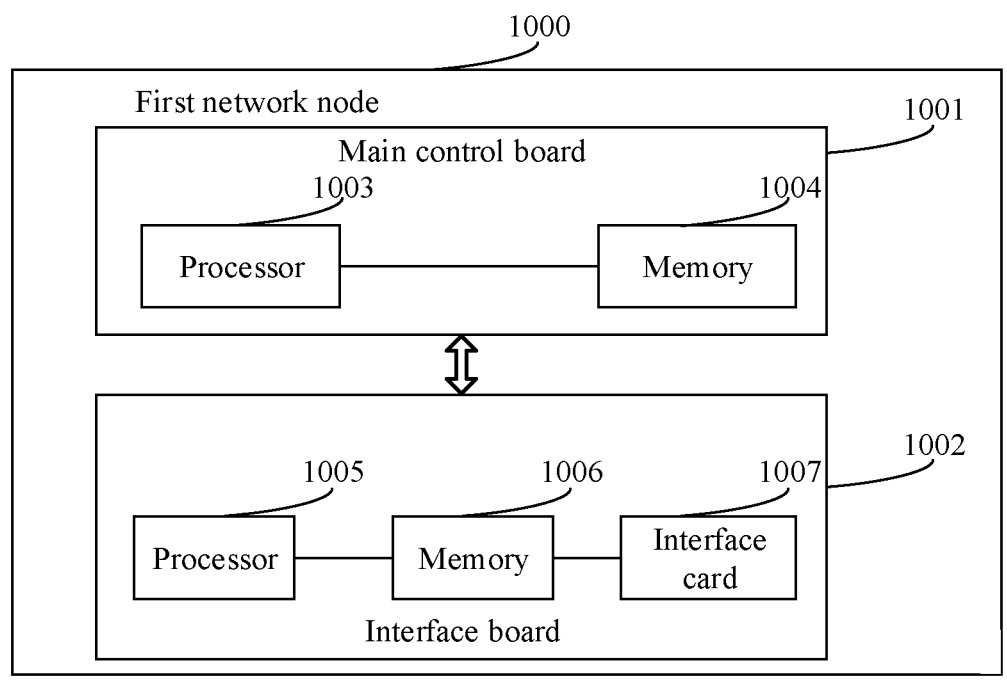
FIG. 10 is a schematic structural diagram of a first network node according to an embodiment of the present disclosure.

Referring to FIG. 10, an embodiment of the present disclosure provides another first network node 1000. The first network node 1000 includes a main control board 1001 and an interface board 1002. The main control board 1001 includes a processor 1003 and a memory 1004. The interface board 1002 includes a processor 1005, a memory 1006, and an interface card 1007. The main control board 1001 is coupled to the interface board 1002.

The hardware may implement a corresponding function of the first network node in the method example in FIG. 2, FIG. 3, or FIG. 6. For example, the memory 1006 may be configured to store program code of the interface board 1002. The processor 1005 is configured to invoke the program code in the memory 1006 to trigger the interface card 1007 to perform receiving and sending of various information that are performed by the first network node in the foregoing method embodiments. The memory 1004 may be configured to store program code of the main control board 1001. The processor 1003 is configured to invoke the program code in the memory 1004 to perform processing other than information receiving and sending of the first network node in the foregoing method embodiments. For example, the processor 1003 is configured to obtain a first packet including a segment list, where the segment list includes a SID of a network node on a path used to forward the first packet, obtain a SID of a second network node from the segment list, where the second network node is a next-hop segment node of the first network node on the path, and replace a destination address of the first packet with the SID of the second network node, and add a network performance parameter of the first network node to the segment list, to generate a second packet. The processor 1005 is configured to receive the second packet sent by the main control board 1001. The interface card 1007 is configured to send the second packet to the second network node. The memory 1004 is configured to store program code and data of the main control board 1001. The memory 1006 is configured to store program code and data of the interface board 1002.

In a possible implementation, an IPC control channel is established between the main control board 1001 and the interface board 1002. The main control board 1001 communicates with the interface board 1002 using the IPC control channel.

The first network node 1000 may be a router, a switch, or a network node having a forwarding function. The first network node 1000 can implement a function of the first network node in the foregoing method embodiments. For specific execution steps, refer to the foregoing method embodiments. Details are not described herein again.

Figure 11:
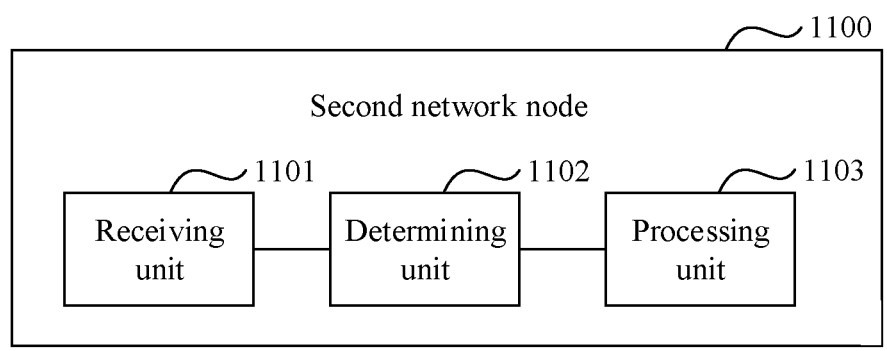
FIG. 11 is a schematic structural diagram of a second network node according to an embodiment of the present disclosure.

FIG. 11 is a possible schematic structural diagram of the second network node in the foregoing embodiments. The second network node 1100 may implement a function of the second network node in the embodiment shown in FIG. 2, FIG. 3, or FIG. 6. Referring to FIG. 11, the second network node 1100 includes a receiving unit 1101, a determining unit 1102, and a processing unit 1103. These units may perform corresponding functions in the foregoing method example. For example, the receiving unit 1101 is configured to receive various information received by the second network node in the foregoing method embodiments. The determining unit 1102 is configured to determine various information determined by the second network node in the foregoing method embodiments. The processing unit 1103 is configured to perform processing other than information receiving and sending and information determining that are performed by the second network node in the foregoing method embodiments. For example, the receiving unit 1101 is configured to receive a packet that includes a segment list and that is sent by a first network node. The segment list includes a SID of a network node on a path used to forward the packet. A first SID in the segment list includes a first network performance parameter of the first network node. The determining unit 1102 is configured to determine that a destination address of the packet is a SID of the second network node 1100. The processing unit 1103 is configured to calculate network performance based on the first network performance parameter in response to that the determining unit 1102 determines that the destination address of the packet is the SID of the second network node 1100.

It should be noted that, in this embodiment of the present disclosure, division into units is an example, and is merely logical function division. In an embodiment, there may be another division manner. Function units in this embodiment of the present disclosure may be integrated into one processing unit, or each of the units may exist alone physically, or two or more units may be integrated into one unit. For example, in the foregoing embodiment, the receiving unit and the sending unit may be a same unit or different units. The integrated unit may be implemented in a form of hardware, or may be implemented in a form of a software function unit.

Figure 12:
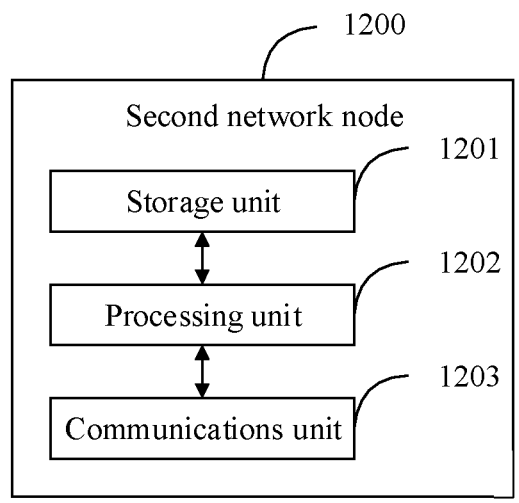
FIG. 12 is a schematic structural diagram of a second network node according to an embodiment of the present disclosure.

When an integrated unit is used, FIG. 12 is another possible schematic structural diagram of the second network node in the foregoing embodiments. The second network node 1200 may also implement a function of the second network node in the embodiment in FIG. 2, or implement a function of the third network node in the embodiment shown in FIG. 3, or implement a function of the network node 106 in the embodiment shown in FIG. 6.

The second network node 1200 includes a storage unit 1201, a processing unit 1202, and a communications unit 1203. The processing unit 1202 is configured to control and manage an action of the second network node 1200. For example, the processing unit 1202 is configured to support the second network node 1200 in performing the process S205 in FIG. 2, the process S309 in FIG. 3, the process S604 in FIG. 6, and/or another process in the technology described in this specification. The communications unit 1203 is configured to support communication between the second network node 1200 and another network entity, for example, communication with the first network node in FIG. 2, or communication with the second network node or the network node 103 shown in FIG. 3 or FIG. 6. The storage unit 1201 is configured to store program code and data of the second network node 1200.

The processing unit 1202 may be a processor, for example, may be a CPU, a general-purpose processor, a DSP, an ASIC, an FPGA or another programming logic device, a transistor logic device, a hardware component, or any combination thereof. The processor may implement or execute various example logical blocks, modules, and circuits described with reference to content disclosed in the embodiments of the present disclosure. Alternatively, the processor may be a combination for implementing a computing function, for example, a combination of one or more microprocessors, or a combination of a DSP and a microprocessor. The communications unit 1203 may be a transceiver. The storage unit 1201 may be a memory.

Figure 13:
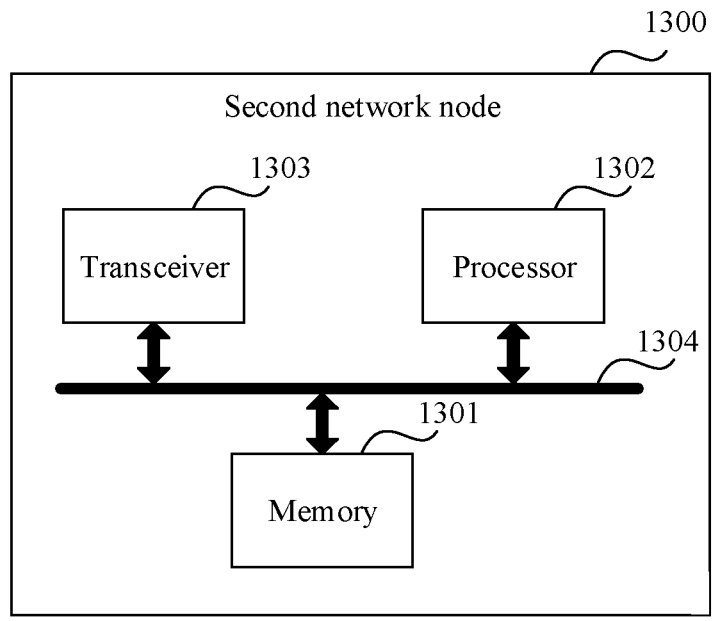
FIG. 13 is a schematic structural diagram of a second network node according to an embodiment of the present disclosure.

When the processing unit 1202 is the processor, the communications unit 1203 is the transceiver, and the storage unit 1201 is the memory, the second network node in this embodiment of the present disclosure may be a second network node 1300 shown in FIG. 13.

Referring to FIG. 13, the second network node 1300 includes a processor 1302, a transceiver 1303, a memory 1301, and a bus 1304. The transceiver 1303, the processor 1302, and the memory 1301 are connected to each other using the bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

Figure 14:
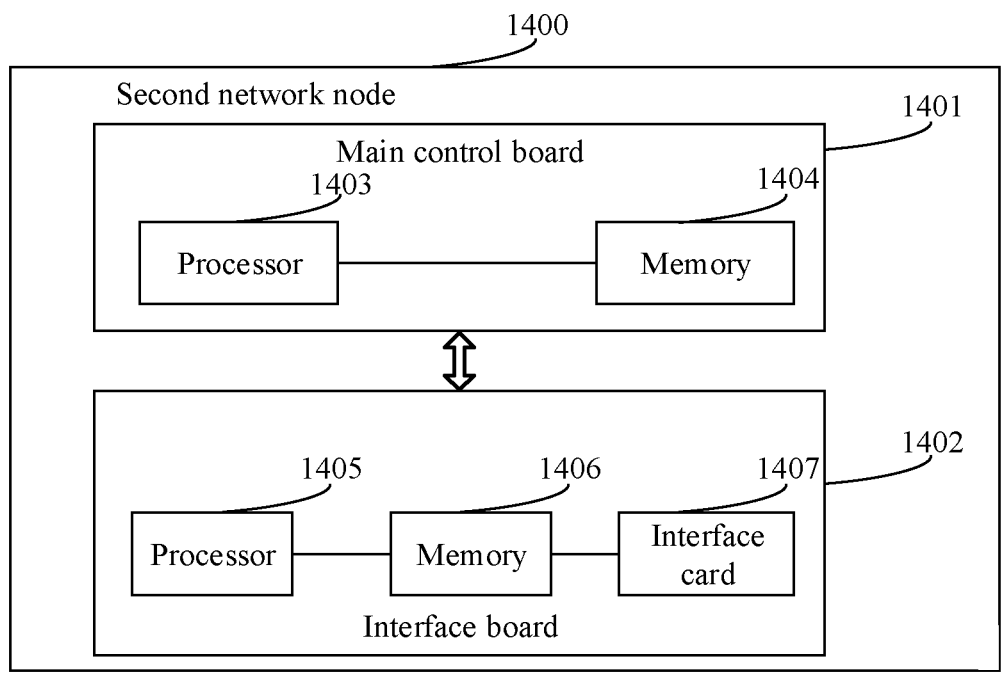
FIG. 14 is a schematic structural diagram of a second network node according to an embodiment of the present disclosure.

Referring to FIG. 14, an embodiment of the present disclosure provides another second network node 1400. The second network node 1400 includes a main control board 1401 and an interface board 1402. The main control board 1401 includes a processor 1403 and a memory 1404. The interface board 1402 includes a processor 1405, a memory 1406, and an interface card 1407. The main control board 1401 is coupled to the interface board 1402.

The hardware may implement functions of the second network node in the embodiment shown in FIG. 2, or implement functions of the third network node in the embodiment shown in FIG. 3, or implement corresponding functions of the network node 106 in the embodiment shown in FIG. 6. For example, the memory 1406 may be configured to store program code of the interface board 1402. The processor 1405 is configured to invoke the program code in the memory 1406 to trigger the interface card 1407 to perform receiving and sending of various information that are performed by a corresponding network node in the foregoing method embodiments. The memory 1404 may be configured to store program code of the main control board 1401. The processor 1403 is configured to invoke the program code in the memory 1404 to perform processing other than information receiving and sending of the corresponding network node in the foregoing method embodiments. For example, the interface card 1407 is configured to receive a packet that includes a segment list and that is sent by a first network node. The segment list includes a SID of a network node on a path used to forward the packet, and a first SID in the segment list includes a first network performance parameter of the first network node. The processor 1405 is configured to send the packet to the main control board 1401. The processor 1403 is configured to determine that a destination address of the packet is a SID of the second network node, and calculate network performance based on the first network performance parameter. The memory 1404 is configured to store program code and data of the main control board 1401. The memory 1406 is configured to store program code and data of the interface board 1402.

In a possible implementation, an IPC control channel is established between the main control board 1401 and the interface board 1402. The main control board 1401 communicates with the interface board 1402 using the IPC control channel.

The second network node 1400 may be a router, a switch, or a network node having a forwarding function. The second network node 1400 can implement a function of the corresponding network node in the foregoing method embodiments. For specific execution steps, refer to the foregoing method embodiments. Details are not described herein again.

Figure 15:
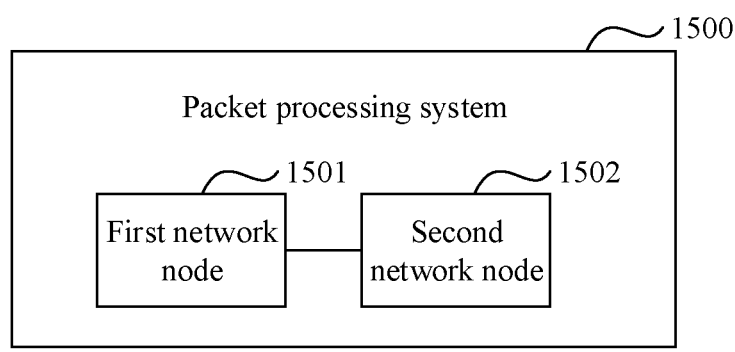
FIG. 15 is a schematic diagram of a packet processing system according to an embodiment of the present disclosure.

Referring to FIG. 15, an embodiment of the present disclosure provides another service packet processing system 1500. The system 1500 is configured to implement the packet processing method in the foregoing method embodiment. The system 1500 includes a first network node 1501 and a second network node 1502. The first network node 1501 and the second network node 1502 may respectively implement functions of the first network node and the second network node in the embodiment shown in FIG. 2, or implement functions of the first network node and the third network node in the embodiment shown in FIG. 3, or implement functions of the network node 101 and the network node 106 in the embodiment shown in FIG. 6. For example, the first network node 1501 performs the processes S201, S202, S203, and S204 in FIG. 2, the processes S301, S302, S303, and S304 in FIG. 3, the process S601 in FIG. 6, and/or another process performed by the first network node in the technology described in this specification. The second network node 1502 is configured to implement the process S205 in FIG. 2, the process S309 in FIG. 3, and/or another process performed by the second network node in the technology described in this specification.

In an example, the system 1500 further includes a third network node. The third network node is configured to implement functions of the second network node in the embodiment shown in FIG. 3 or FIG. 2, for example, perform the processes S306, S307, and S308 in FIG. 3.

An embodiment of the present disclosure further provides a non-volatile storage medium configured to store a software instruction used in the foregoing embodiment. The software instruction includes a program used to perform the method shown in the foregoing embodiment. When the program is executed on a computer or a network node, the computer or the network node is enabled to perform the method in the foregoing method embodiment.

"First" in the first network node in the embodiments of the present disclosure is merely used as a name identifier, and does not mean being the first in a sequence. For the words "second" and "third", this rule is also applicable.

It should be noted that any apparatus embodiment described above is merely an example. The units described as separate parts may or may not be physically separate, and parts displayed as units may or may not be physical units, may be located in one position, or may be distributed on a plurality of network units. Some or all of the modules may be selected based on an embodiment to achieve the objectives of the solutions of the embodiments. In addition, in the accompanying drawings of the embodiments of the first network node or the controller provided in the present disclosure, connection relationships between modules indicate that the modules have communication connections with each other, which may be further implemented as one or more communications buses or signal cables. A person of ordinary skill in the art may understand and implement the embodiments without creative efforts.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to the processor such that the processor can read information from the storage medium, and write information into the storage medium. Certainly, the storage medium may alternatively be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose or dedicated computer.

In the foregoing specific implementations, the objectives, technical solutions, and beneficial effects of the present disclosure are further described in detail. It should be understood that the foregoing descriptions are merely specific implementations of the present disclosure.

What is claimed is:

1. A packet processing method implemented by a first network node and comprising:
    obtaining a first packet that comprises a segment list, wherein the segment list comprises segment identifiers of network nodes on a path that forwards the first packet, wherein the segment identifiers comprise a second segment identifier of a second network node, and wherein the second network node is a next-hop segment node of the first network node on the path;
    obtaining the second segment identifier from the segment list;
    replacing a destination address of the first packet with the second segment identifier;
    adding a network performance parameter of the first network node within the second segment identifier within the segment list to generate a second packet, wherein the network performance parameter is based on receipt or transmission of packets at the first network node; and sending the second packet to the second network node.

2. The packet processing method of claim 1, wherein the network performance parameter comprises a time at which the first network node sends the second packet.

3. The packet processing method of claim 1, wherein the network performance parameter comprises a quantity of service packets that correspond to a service identifier and that are received by the first network node before the first network node sends the second packet, and wherein the service packets are forwarded along the path.

4. The packet processing method of claim 1, further comprising storing the network performance parameter between a 65th bit and a 128th bit of the second segment identifier.

5. The packet processing method of claim 1, wherein the segment identifiers further comprise a first segment identifier of the first network node, and wherein the packet processing method further comprises adding the network performance parameter to the first segment identifier.

6. The packet processing method of claim 1, further comprising further adding the network performance parameter independent of instructions in the segment list.

7. A packet processing method implemented by a second network node and comprising:
 receiving a packet from a first network node, wherein the packet comprises a segment list, wherein the segment list comprises segment identifiers of network nodes on a path that forwards the packet, wherein the segment identifiers comprise a second segment identifier of the second network node, wherein the second segment identifier comprises a first network performance parameter of the first network node, wherein the second network node is a next-hop segment node of the first network node on the path, and wherein the first network performance parameter is based on receipt or transmission of packets at the first network node;
 determining that a destination address of the packet is the second segment identifier; and
 calculating network performance based on the first network performance parameter and in response to the destination address being the second segment identifier.

8. The packet processing method of claim 7, wherein the first network performance parameter comprises a first time at which the first network node sends the packet to the second network node.

9. The packet processing method of claim 8, wherein calculating the network performance comprises:
 determining a second time at which the second network node receives the packet; and
 determining a forwarding delay that is equal to a difference between the second time and the first time.

10. The packet processing method of claim 8, wherein the segment identifiers further comprise a third segment identifier, wherein the third segment identifier comprises a third network performance parameter of a third network node, wherein the third network node is between the first network node and the second network node on the path, wherein the third network performance parameter comprises a third time at which the third network node sends the packet to the second network node, and wherein calculating the network performance comprises determining a forwarding delay that is equal to a difference between the third time and the first time.

11. The packet processing method of claim 7, wherein the first network performance parameter comprises a first quantity of service packets that correspond to a service identifier and that are received by the first network node before the second network node receives the packet, and wherein the service packets that correspond to the service identifier are forwarded along the path.

12. The packet processing method of claim 11, further comprising receiving, from the first network node and before the second network node receives the packet, a second quantity of service packets that correspond to the service identifier, wherein calculating the network performance comprises determining a quantity of lost packets during forwarding of the first quantity of service packets, wherein the quantity of lost packets is equal to a difference between the second quantity and the first quantity.

13. The packet processing method of claim 11, wherein the segment identifiers further comprise a third segment identifier, wherein the third segment identifier comprises a third network performance parameter of a third network node, wherein the third network performance parameter comprises a third quantity of service packets that correspond to the service identifier and that are received by the third network node, wherein calculating the network performance comprises determining a quantity of lost packets lost during forwarding of the service packets corresponding to the service identifier from the first network node to the third network node, and wherein the quantity of lost packets is equal to a difference between the third quantity and the first quantity.

14. A first network node comprising:
 a processor configured to:
  obtain a first packet comprising a segment list, wherein the segment list comprises segment identifiers of network nodes on a path that forwards the first packet, wherein the segment identifiers comprise a second segment identifier of a second network node, and wherein the second network node is a next-hop segment node of the first network node on the path;
  obtain the second segment identifier from the segment list;
  replace a destination address of the first packet with the second segment identifier; and
  add a network performance parameter of the first network node within the second segment identifier within the segment list to generate a second packet, wherein the network performance parameter is based on receipt or transmission of packets at the first network node; and
 a network interface coupled to the processor and configured to send the second packet generated to the second network node.

15. The first network node of claim 14, wherein the network performance parameter comprises a time at which the first network node sends the second packet.

16. The first network node of claim 14, wherein the network performance parameter comprises a quantity of service packets that correspond to a service identifier and that are received by the first network node before the first network node sends the second packet, and wherein the service packets are forwarded along the path.

17. The first network node of claim 14, wherein the processor is further configured to store the network performance parameter between a 65th bit and a 128th bit of the second segment identifier.

18. The first network node of claim 14, wherein the segment identifiers further comprise a first segment identifier of the first network node, and wherein the processor is further configured to add the network performance parameter to the first segment identifier.

19. The first network node of claim 14, wherein the processor is further configured to further add the network performance parameter independent of instructions in the segment list.

20. A second network node comprising:
a network interface configured to receive a packet from a first network node, wherein the packet comprises a segment list, wherein the segment list comprises segment identifiers of network nodes on a path that forwards the packet, wherein the segment identifiers comprise a second segment identifier of the second network node, wherein the second segment identifier comprises a first network performance parameter of the first network node, wherein the second network node is a next-hop segment node of the first network node on the path, and wherein the first network performance parameter is based on receipt or transmission of packets at the first network node; and
a processor coupled to the network interface and configured to:
determine that a destination address of the packet is the second segment identifier; and
calculate network performance based on the first network performance parameter and in response to the destination address being the second segment identifier.

21. The second network node of claim 20, wherein the first network performance parameter comprises a first time at which the first network node sends the packet to the second network node.

22. The second network node of claim 21, wherein the processor is further configured to calculate the network performance by:
determining a second time at which the second network node receives the packet; and
determining a forwarding delay that is equal to a difference between the second time and the first time.

23. The second network node of claim 21, wherein the segment identifiers further comprise a third segment identifier, wherein the third segment identifier comprises a third network performance parameter of a third network node, wherein the third network node is between the first network node and the second network node on the path, wherein the third network performance parameter comprises a third time at which the third network node sends the packet to the second network node, and wherein the processor is further configured to calculate the network performance by determining a forwarding delay that is equal to a difference between the third time and the first time.

24. The second network node of claim 20, wherein the first network performance parameter comprises a first quantity of service packets that correspond to a service identifier and that are received by the first network node before the second network node receives the packet, and wherein the first quantity of service packets are forwarded along the path.

25. The second network node of claim 24, wherein the network interface is further configured to receive, from the first network node and before the second network node receives the packet, a second quantity of service packets that correspond to the service identifier, and wherein the processor is further configured to calculate the network performance by determining a third quantity of lost packets lost during forwarding of the first quantity of service packets, and wherein the third quantity is equal to a difference between the second quantity and the first quantity.

26. The second network node of claim 24, wherein the segment identifiers further comprise a third segment identifier, wherein the third segment identifier comprises a third network performance parameter of a third network node, wherein the third network performance parameter comprises a third quantity of service packets that correspond to the service identifier and that are received by the third network node, wherein the processor is further configured to calculate the network performance by determining a quantity of lost packets lost during forwarding of the service packets corresponding to the service identifier from the first network node to the third network node, and wherein the quantity of lost packets is equal to a difference between the third quantity and the first quantity.

* * * * *